United States Patent
Sun et al.

(10) Patent No.: US 7,666,557 B2
(45) Date of Patent: Feb. 23, 2010

(54) LIQUID CRYSTAL DISPLAY PANEL, COLOR FILTER AND MANUFACTURING METHODS THEREOF

(75) Inventors: Wei-Chieh Sun, Hsinchu (TW);
Ming-Sheng Lai, Hsinchu (TW);
Rung-Guang Hu, Hsinchu (TW);
Hsiang-Pin Fan, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 62 days.

(21) Appl. No.: 11/947,790

(22) Filed: Nov. 30, 2007

(65) Prior Publication Data
US 2008/0068541 A1    Mar. 20, 2008

Related U.S. Application Data

(62) Division of application No. 10/709,037, filed on Apr. 8, 2004.

(30) Foreign Application Priority Data
Dec. 26, 2003    (TW) .............................. 92136978 A

(51) Int. Cl.
*G02B 5/20*    (2006.01)
*G03F 1/1335*    (2006.01)

(52) U.S. Cl. .......................................... 430/7; 349/106

(58) Field of Classification Search ................ None
See application file for complete search history.

(56) References Cited

U.S. PATENT DOCUMENTS

| 5,844,645 A | * | 12/1998 | Kashimoto | .................. 349/106 |
| 2001/0019388 A1 | * | 9/2001 | Kim et al. | .................... 349/129 |
| 2003/0076572 A1 | * | 4/2003 | Kawase | ....................... 359/245 |

* cited by examiner

*Primary Examiner*—John A. McPherson
(74) *Attorney, Agent, or Firm*—Jianq Chyun IP Office

(57) ABSTRACT

A color filter and a manufacturing method thereof are provided. In the method of the invention, a substrate having a display area and a non-display area is provided. Thereafter, a black matrix is formed over the substrate, wherein black matrix defines the display area into a plurality of sub-pixel areas, and covers the non-display area, which forms an edge of the display area. Then, a color filter unit is formed in each sub-pixel area, and a light shielding layer is formed over the black matrix simultaneously. Accordingly, the shielding layer of the color filter provided by the present invention is capable of effectively reducing the light leakage from the edge of the display area.

18 Claims, 7 Drawing Sheets

LIQUID CRYSTAL DISPLAY PANEL, COLOR FILTER AND MANUFACTURING METHODS THEREOF

CROSS-REFERENCE TO RELATED APPLICATION

This is a divisional application of patent application Ser. No. 10/709,037, filed on Apr. 8, 2004, which claims the priority benefit of Taiwan application serial no. 92136978, filed Dec. 26, 2003, now U.S. Pat. No. 7,335,450. The entirety of each of the above-mentioned patent applications is hereby incorporated by reference herein and made a part of this specification.

BACKGROUND OF THE INVENTION

1. Field of the Invention

The present invention generally relates to a color filter and the manufacturing method thereof. More particularly, the present invention relates to a color filter comprising a light shielding layer formed on the black matrix of the non-display area for avoiding the light leakage from the edge area of the display and the manufacturing method thereof.

2. Description of the Related Art

As the development of the performance of computer, internet, and multimedia technology, the transformation of image information has gradually progressed from analog transformation to digital transformation. In recently years, the size and weight of many electronic device has become thin and light. As to a display device, although the conventional cathode ray tube (CRT) display is widely used, however, it has the disadvantages of large size, high radiation, heavy weight and high power consumption. Therefore, the flat panel display (FPD) is being developed having the advantages of thinner, flatter, lighter, radiation free and low power consumption, and has gradually become the mainstream of display devices. The flat panel display (FPD) including, for example, liquid crystal display (LCD), organic light emitting display (OLED) or plasma display panel (PDP).

In recent year, the liquid crystal display (LCD) is developed for the application of full-color, larger display area, higher resolution and low-cost. The color display of the liquid crystal display (LCD) is generally performed by color filters. The color filter is generally constructed over a transparent glass substrate, wherein a black matrix for light shielding, and color filter units such as red filter unit, green filter unit and blue filter unit arranged corresponding to each sub-pixel, are disposed over the transparent glass substrate. The structure of color filter will be described in detail hereinafter.

FIG. 1 is a cross-sectional view schematically illustrating the structure of a conventional color filter. Referring to FIG. 1 a color filter 100 includes a substrate 102, black matrices 104a and 104b, a plurality of color filter unit 106 and a common electrode 108. The substrate 102 includes a display area 102a in the center of the substrate 102 and a non-display area 102b surrounding the edge of the display area 102a. The black matrices 104a and 104b are disposed on the surface of the substrate 102, wherein a plurality of sub-pixel area 110 are defined by the black matrix 104a in the display area 102a, and the black matrix 104b covers the non-display area 102b that adjacent to the edge of the display area 102a. Furthermore, the color filter unit 106 is composed of a plurality of photoresists that have different colors respectively (for example, a red photoresist, a green photoresist and a blue photoresist). Each color of photoresist is disposed in the corresponding sub-pixel area 110 defined by the black matrix 104 by performing conventional photolithography, etching and developing process. Further, a common electrode 108 is further formed on the surfaces of the black matrices 104a, 104b and the color filter unit 106.

Next, referring to FIG. 1, a variety of color lights are generated by performing a white light through the color filter unit 106, wherein the black matrix 104a of the display area 102a is provided for separating the different light colors. Therefore, contrast between different light colors and the purity of each color are enhanced. Furthermore, the black matrix 104b covering the non-display area 102b adjacent to the edge of the display area 102a is provided for preventing the leakage of light from the non-display area 102b in order to enhance the image quality of the liquid crystal display (LCD).

In conventional art, the material of the black matrix generally includes chromium metal. However, use of chromium metal the black matrix is an environmental concern, and therefore some proposed to replace the chromium metal by a black resin. It is noted that, because of the light shielding effect provided by the black resin is poor compared to the chromium metal, a portion of lights will still leak out from the non-display area. Thus, the light leakage from the edge of the display area is still a problem for the color filter.

SUMMARY OF THE INVENTION

Accordingly, to the present invention provides a color filter capable of reducing light leakage from the edge of the display area.

The present invention also provides a method of fabricating the color filter mentioned above. A substrate having a display area and a non-display area formed thereon is provided. A black matrix is formed over the substrate, wherein the black matrix defines the display area into a plurality of first sub-pixel areas, a plurality of second sub-pixel areas and a plurality of third sub-pixel areas. The black matrix covers the non-display area, which forms an edge of the display area edge. Next, a first color filter unit is formed in each first sub-pixel area, and a first light shielding layer is formed over the black matrix of the non-display area simultaneously. Thereafter, at least a second color filter unit and at least a third color filter unit is correspondingly formed in each second sub-pixel area and each third sub-pixel area respectively.

Furthermore, a second light shielding layer is optionally formed over the first light shielding layer. Furthermore, a third light shielding layer is further optionally formed over the second light shielding layer. Moreover, when the color filter is provided for multi-domain vertical alignment (MVA) liquid crystal display panel, a plurality of alignment bumps are further formed over the black matrix, the first color filter unit, the second color filter unit and the third color filter unit.

The present invention provides a method of forming a color filter for multi-domain vertical alignment (MVA) liquid crystal display panel. A substrate having a display area and a non-display area formed thereon is provided. A black matrix is formed over the substrate, wherein the black matrix defines the display area into a plurality of first sub-pixel areas, a plurality of second sub-pixel areas and a plurality of third sub-pixel areas. The black matrix covers the non-display area, which forms an edge of the display area edge. Then, a first color filter unit, a second color filter unit and a third color filter unit are respectively formed in the first sub-pixel areas, the second sub-pixel areas and the third sub-pixel areas. Thus, a plurality of alignment bumps are formed over the black matrix, the first color filter unit, the second color filter unit and the third color filter unit. Next, a first light shielding layer is formed over the black matrix of the non-display area, which forms an edge of the display area.

Further, in the color filter described above, a second light shielding layer may be disposed between the black matrix and the first light shielding layer.

Furthermore, in the color filter described above, a third light shielding layer may be disposed between the second color filter unit and the first light shielding layer.

Furthermore, in the color filter described above, a fourth light shielding layer may be disposed between the third color filter unit and the first light shielding layer.

The color filter of the present invention comprises a substrate, a black matrix, a plurality of color filter units and a light shielding layer. The substrate comprises a display area and a non-display area. The black matrix is disposed over the substrate, and the material of the black matrix includes, for example but not limited to, black resin. The black matrix defines the display area into a plurality of sub-pixel areas and covers the non-display area that forms an edge of the display area. Furthermore, the color filter unit is disposed in the sub-pixel area, and the light shielding layer is disposed over the black matrix.

Furthermore, the color filter unit comprises, for example but not limited to, a plurality of red photoresist units, a plurality of green photoresist units and a plurality of blue photoresist units. The light shielding layer is formed together with the color filter unit. Accordingly, the light shielding layer may be comprised of a single layer or a multi-layer structure. The light shielding layer comprises, for example but not limited to, red photoresist, green photoresist or blue photoresist, or a combination thereof. Furthermore, the color filter of the present invention may also be provided for a multi-domain vertical alignment (MVA) liquid crystal display panel, wherein a plurality of alignment bumps are disposed over, for example but not limited to, the color filter unit and the black matrix. The light shielding layer may be formed together with the alignment bump. Further, the light shielding layer may be comprised of color photoresists or the material of the alignment bump.

In summary, the color filter of the present invention provides a light shielding layer over the black matrix of the non-display area to seal the edge of the display area. Therefore, the light leakage from the edge of the display area can be reduced. It is to be noted that, in the manufacturing method of the color filter of the present invention, only the design of the mask of the color photoresist or alignment bump are required to be modified, however the manufacturing process and the materials need not changed.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The following drawings illustrate embodiments of the invention and, together with the description, serve to explain the principles of the invention.

DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
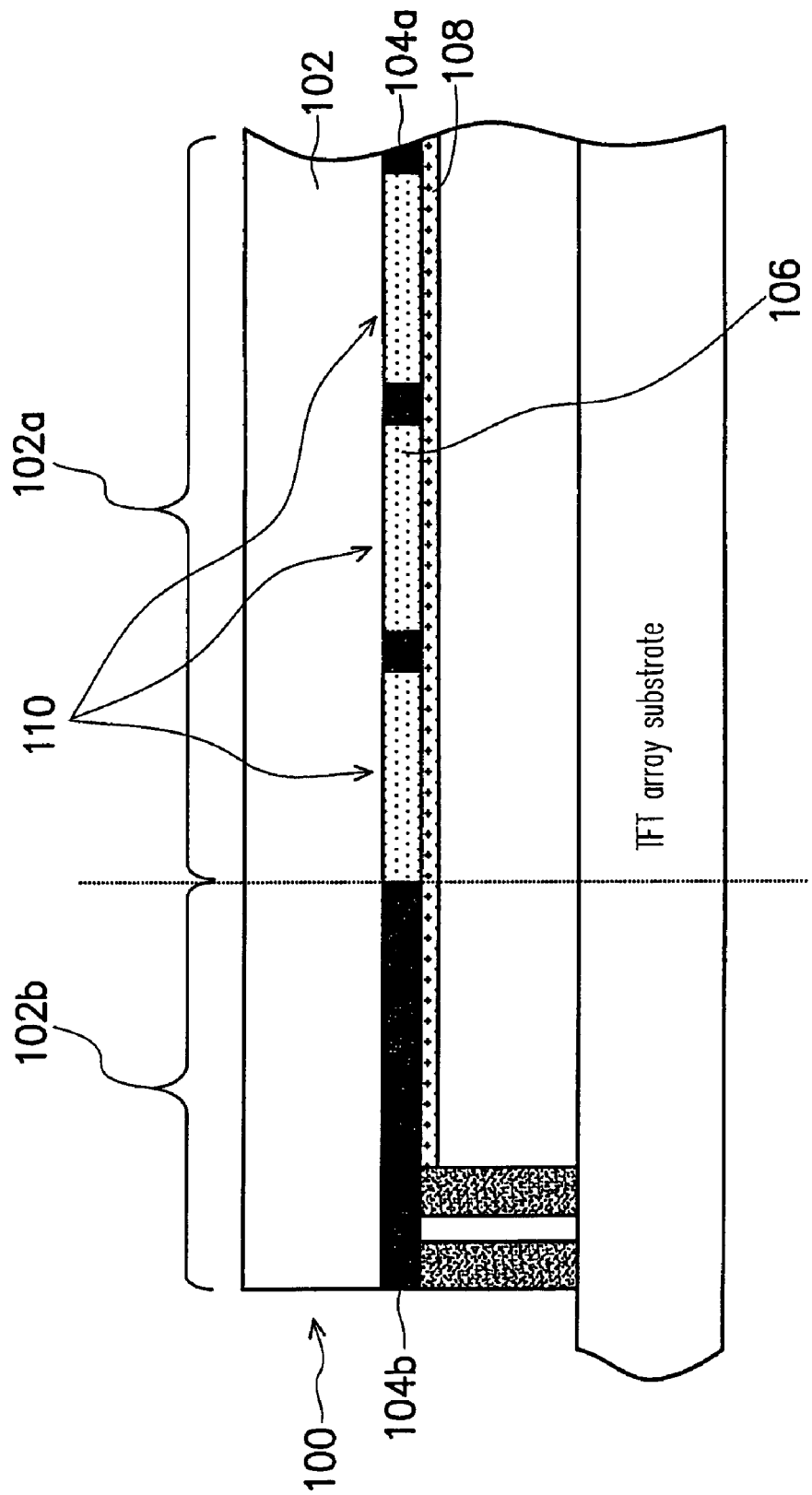
FIG. 1 is a cross-sectional view schematically illustrating the structure of a conventional color filter.
Figure 2A:
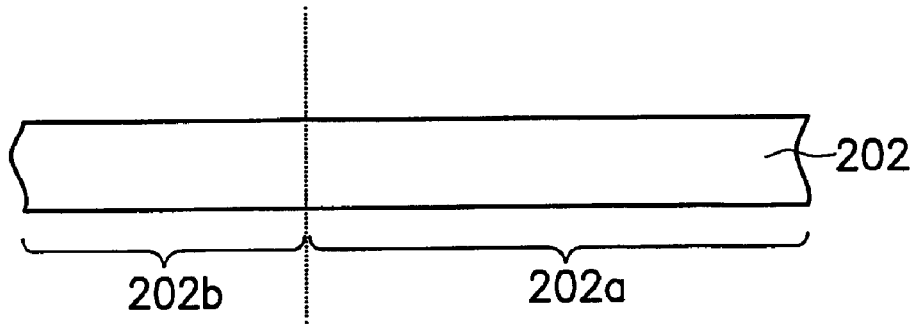
FIG. 2A to FIG. 2F are cross-sectional views schematically illustrating a process of forming a color filter according to an embodiment of the present invention.
Figure 2B:
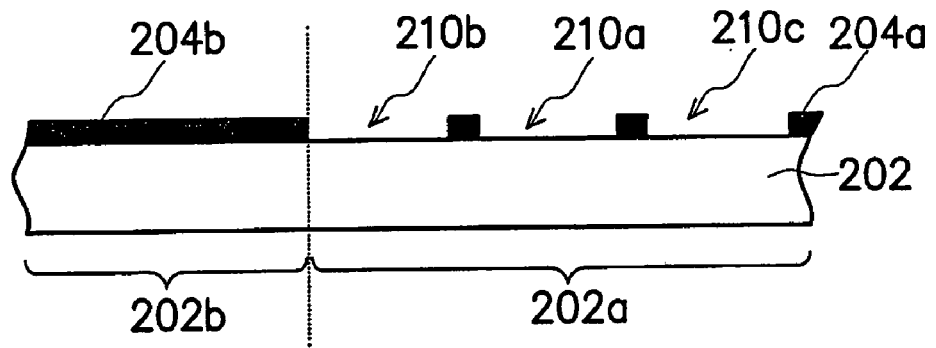

FIG. 2A to FIG. 2F are cross-sectional views schematically illustrating a process of forming a color filter according to an embodiment of the present invention. Referring to FIG. 2A, a substrate 202 is provided. The substrate includes, for example but not limited to, a transparent substrate comprised of a glass or a plastic material. Moreover, the substrate 202 is defined into a display area 202a and a non-display area 202b, wherein the non-display area 202b surrounds the display area 202a. Next, referring to FIG. 2B, a patterned black matrix layer is formed over the substrate, wherein portions of the patterned black matrix 204a are formed over the display area 202a and a portion of the patterned black matrix 204b is formed over the non-display area 202b. The patterned black matrix layer comprises a non-transparent material including, for example but not limited to, black resin. The patterned black matrix can be formed by performing conventional photolithography, etching and developing process. The portions of patterned black matrix 204a defines the display area 202a into a plurality of first sub-pixel areas 210a, a plurality of second sub-pixel areas 210b and a plurality of third sub-pixel areas 210c. The portion of patterned black matrix layer 204b covers the non-display area 202b and forms an edge of the display area 202a.

Figure 2C:
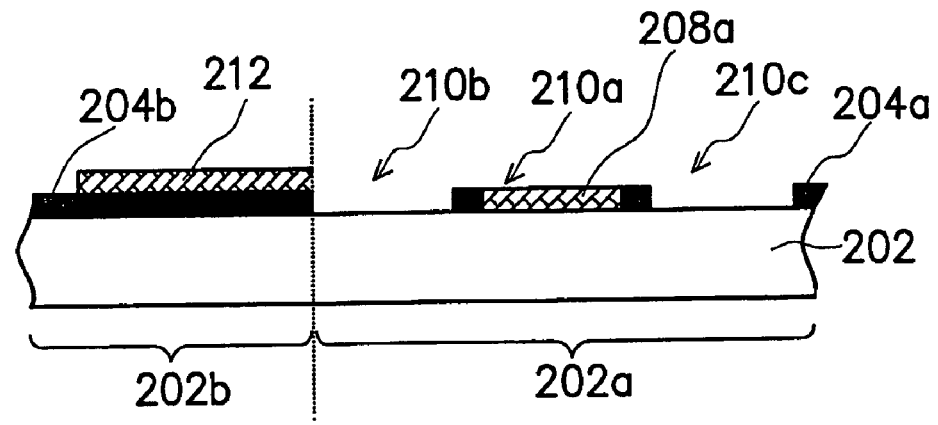

Next, referring to FIG. 2C, a first color filter unit 208a is formed in the first sub-pixel areas 210a. For example, a first color photoresist layer is formed over the substrate 203 and then a conventional photolithography, etching and developing process may be performed over the first color photoresist layer to form the first color filter unit 208a. At the same time, a light shielding layer 212 is formed on the portion of the patterned black matrix 204b over the non-display area 202b.

Figure 2D:
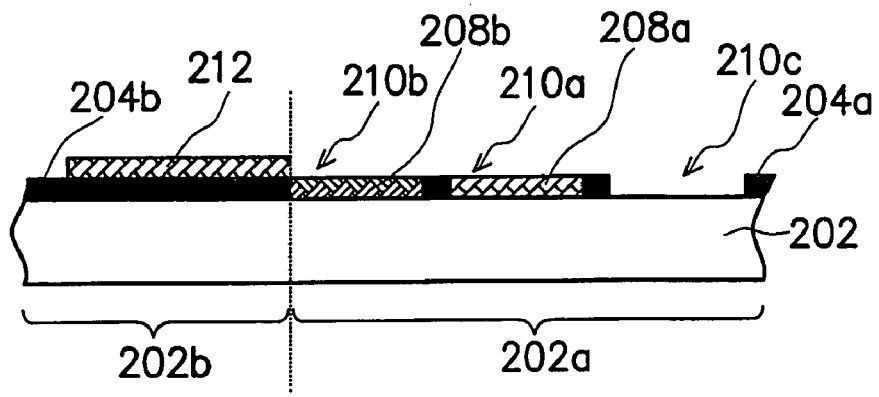

Next, referring to FIG. 2D, a second color filter unit 208b is formed in the second sub-pixel areas 210b. For example, a second color photoresist layer is formed over the substrate 202 and then a conventional photolithography, etching and developing process may be performed over the second color photoresist layer to form the second color filter unit 208b.

Figure 2E:
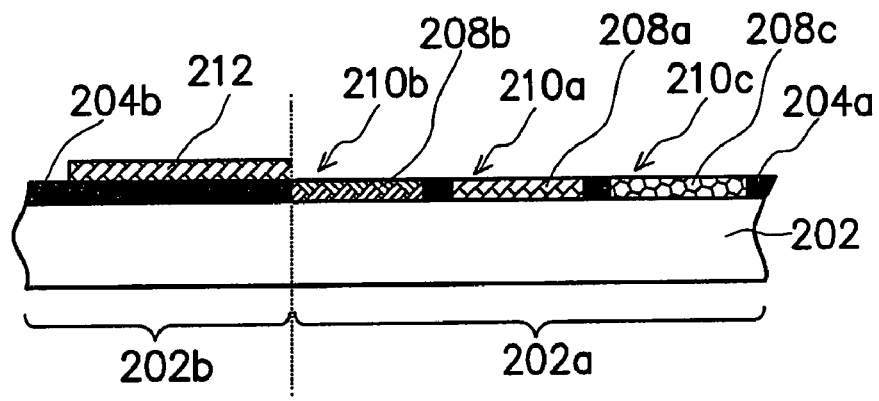

Thereafter, referring to FIG. 2E, a third color filter unit 208c is formed in the third sub-pixel areas 210c. For example, a third color photoresist is formed over the substrate 202 and then a conventional photolithography, etching and developing process may be performed over the third color photoresist layer to form the third color filter unit 208c.

Figure 2F:
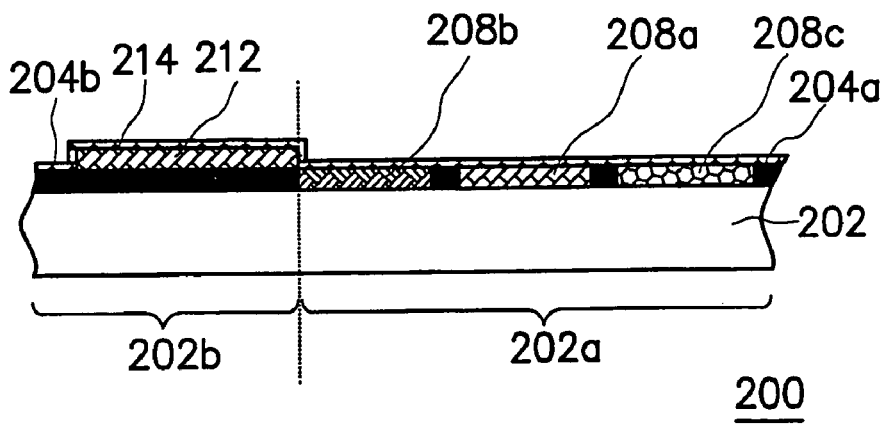

Finally, referring to FIG. 2F, a common electrode 214 is formed over the substrate 202. The common electrode 214 covers the portions of the patterned black matrix 204a, portion of the patterned black matrix 204b, the light shielding layer 212, the first color filter unit 208a, the second color filter unit 208b and the third color filter unit 208c.

Figure 3:
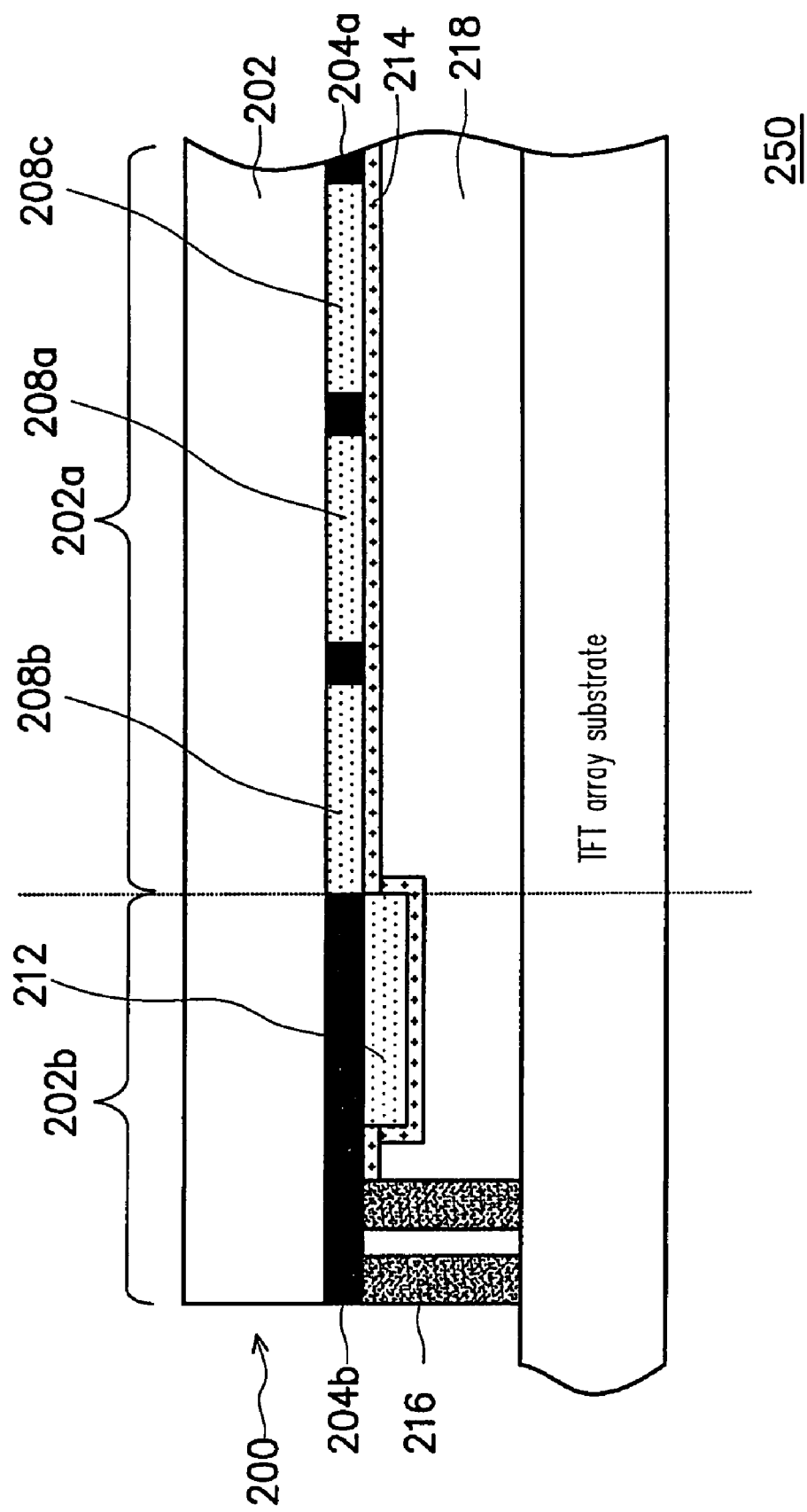
FIG. 3 is a cross-sectional view schematically illustrating a structure of a color filter shown in FIG. 2.

FIG. 3 is a cross-sectional view schematically illustrating a structure of a color filter shown in FIG. 2. Referring to FIG. 3, a liquid crystal display panel 250 is formed by, for example but not limited to, performing the steps of disposing the glue 216 on the substrate, compressing the substrate and then injection the liquid crystal 218 into the color filter 200. Accordingly, the polarization direction of the white light entering the thin film transistor (TFT) array substrate is changed by the liquid crystal layer 218. Then the white light is filtered by the first color filter unit 208a, the second color filter unit 208b and the third color filter unit 208c respectively, thus a variety of color lights are generated. Because a light shielding layer 212 is formed over the black matrix 204b of the non-display area 202b, the light shielding capability of the non-display area 202b is improved, and the light leakage via the edge of the display area 202a is reduced.

In an embodiment of the present invention, a light shielding layer of the color filter is formed over the black matrix of the non-display area, which forms an edge of the display area, therefore the transparency of the non-display area to light is also reduced. In another embodiment of the present invention, the light shielding layer can be formed together with any color filter unit. In an embodiment of the invention, for example, if the filter units of the color filter is formed using a red filter unit, a green filter unit and a blue filter unit, the light shielding layer may be formed, for example but not limited to, together with the blue filter unit, by using a blue photoresist layer.

Figure 4:
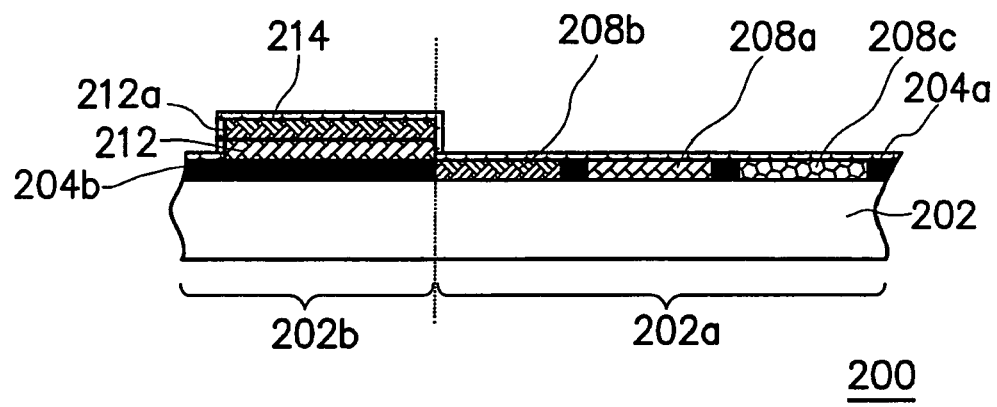
FIG. 4 is a cross-sectional view schematically illustrating a color filter having double light shielding layers according to an embodiment of the present invention.

FIG. 4 is a cross-sectional view schematically illustrating a color filter having double light shielding layers according to an embodiment of the present invention. In the invention, except for providing a color filter having a light shielding layer formed from the blue filter unit, a color filter having a double light shielding layer shown in FIG. 4 can also be provided. As show in FIG. 4, a first light shielding layer 212 is formed before the first color (red) filter unit 208a is formed. Thereafter, when the second color (blue) filter unit 208b is formed, a second light shielding layer 212a is formed over the first light shielding layer 212. Thus, the light shielding layer has a double layer structure comprising red photoresist and blue photoresist layers.

Figure 5:
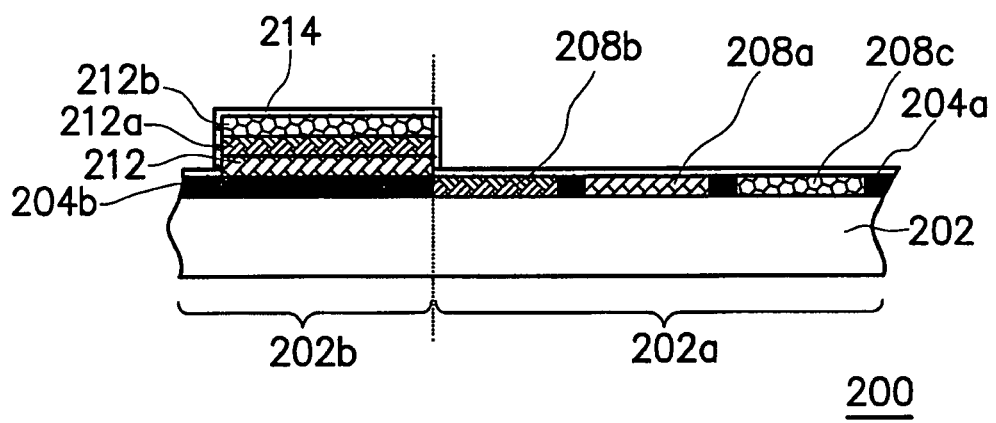
FIG. 5 is a cross-sectional view schematically illustrating a color filter having double light shielding layers according to another embodiment of the present invention.

FIG. 5 is a cross-sectional view schematically illustrating a color filter having double light shielding layers according to another embodiment of the present invention. Moreover, as shown in FIG. 5, when the third color (green) filter unit 208c is formed, a third light shielding layer 212b is formed over the second light shielding layer 212a. Thus, the light shielding layer has a triple layer structure comprising red, blue and green photoresist layers. The light shielding layer is comprised of, for example but not limited to, the combination of red, green or blue photoresist layers (for example, a combination of red photoresist/blue photoresist or red photoresist/green photoresist/blue photoresist). The sequence of the photoresist in the combination may be dependent on the manufacturing process of the color filter unit or the design of the mask.

Figure 6:
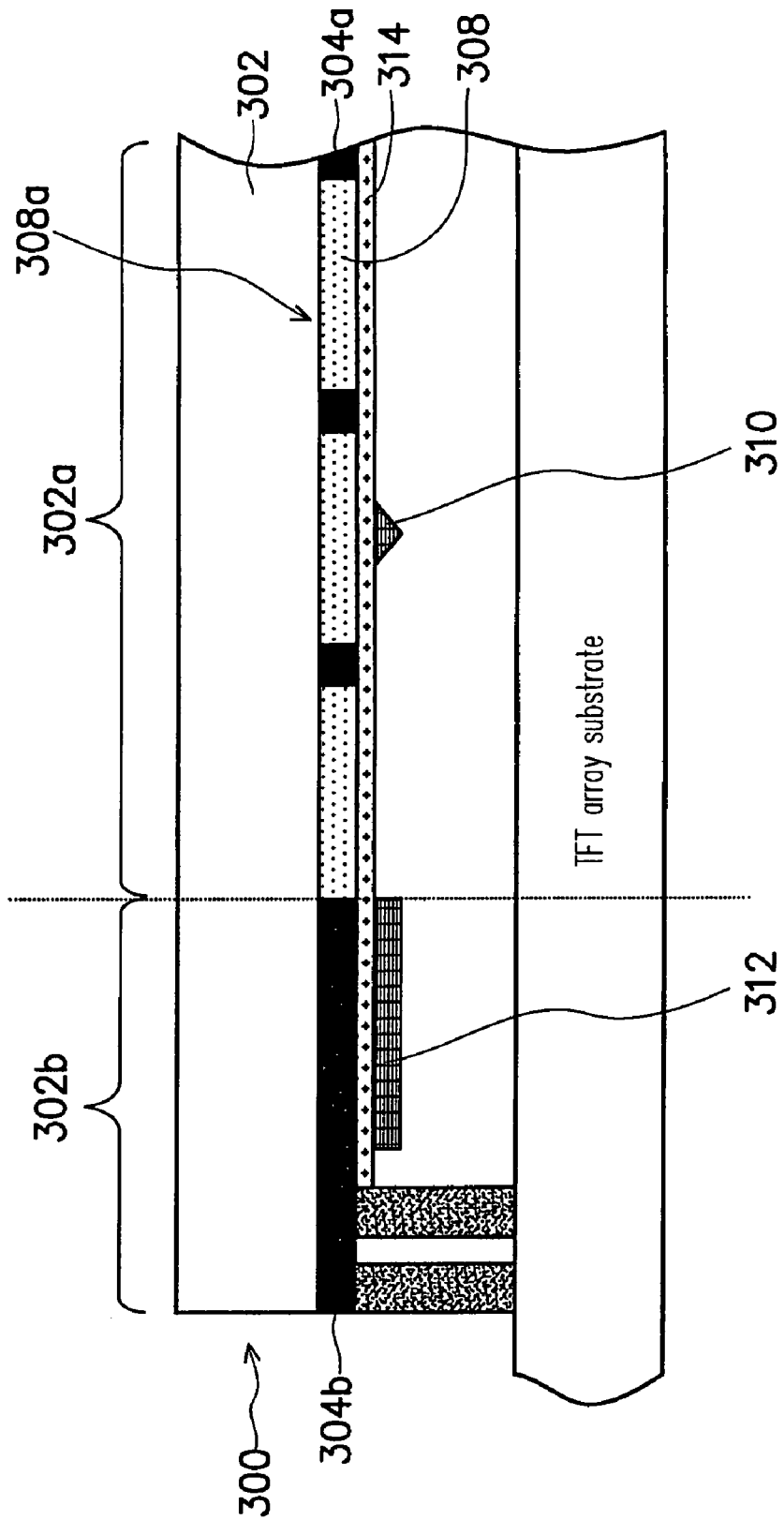
FIG. 6 and FIG. 7 are respectively cross-sectional views schematically illustrating a liquid crystal display panel having a multi-domain vertical alignment (MVA) structure according to an embodiment of the present invention.

In another embodiment of the present invention, the color filter and the manufacturing method of the invention can be provided for any type of liquid crystal display panel, for example but not limited to, a multi-domain vertical alignment (MVA) liquid crystal display panel. FIG. 6 is a cross-sectional view schematically illustrating a liquid crystal display panel having a multi-domain vertical alignment (MVA) structure according to an embodiment of the present invention. The color filter 300 comprises, for example but not limited to, a substrate 302, black matrices 304a and 304b, a plurality of color filter units 308, a plurality of alignment bumps 310, a light shielding layer 312 and a common electrode 314. The substrate 302 comprises a display area 302a and a non-display area 302b, wherein the black matrices 304a and 304a are disposed-over the substrate 302. The material of the black matrices 304a and 304a includes, for example but not limited to, a black resin. The black matrix 304a defines a plurality of sub-pixel area 308a in the display area 302a, and the black matrix 304b covers non-display area 302b, which forms the edge of the display area 302a.

Next, referring to FIG. 6, the color filter units 308 are disposed in the sub-pixel area 308a respectively, and are formed, for example but not limited to, by a variety of photoresist layers having different colors (such as red photoresist, green photoresist or blue photoresist) using exposing and developing process. Furthermore, the alignment bump 310 is disposed over the common electrode 314 and in the display area 302a, and is formed, for example but not limited to, by performing photolithography process including masking, exposing and developing process on a photosensitive material. Moreover, as shown in FIG. 6, the light shielding layer 312 of the color filter 300 is formed with the alignment bump 310a, and the light shielding layer 312 is disposed over the common electrode 314 and in the non-display area 302b adjacent to the edge of the display area 302a.

Figure 7:
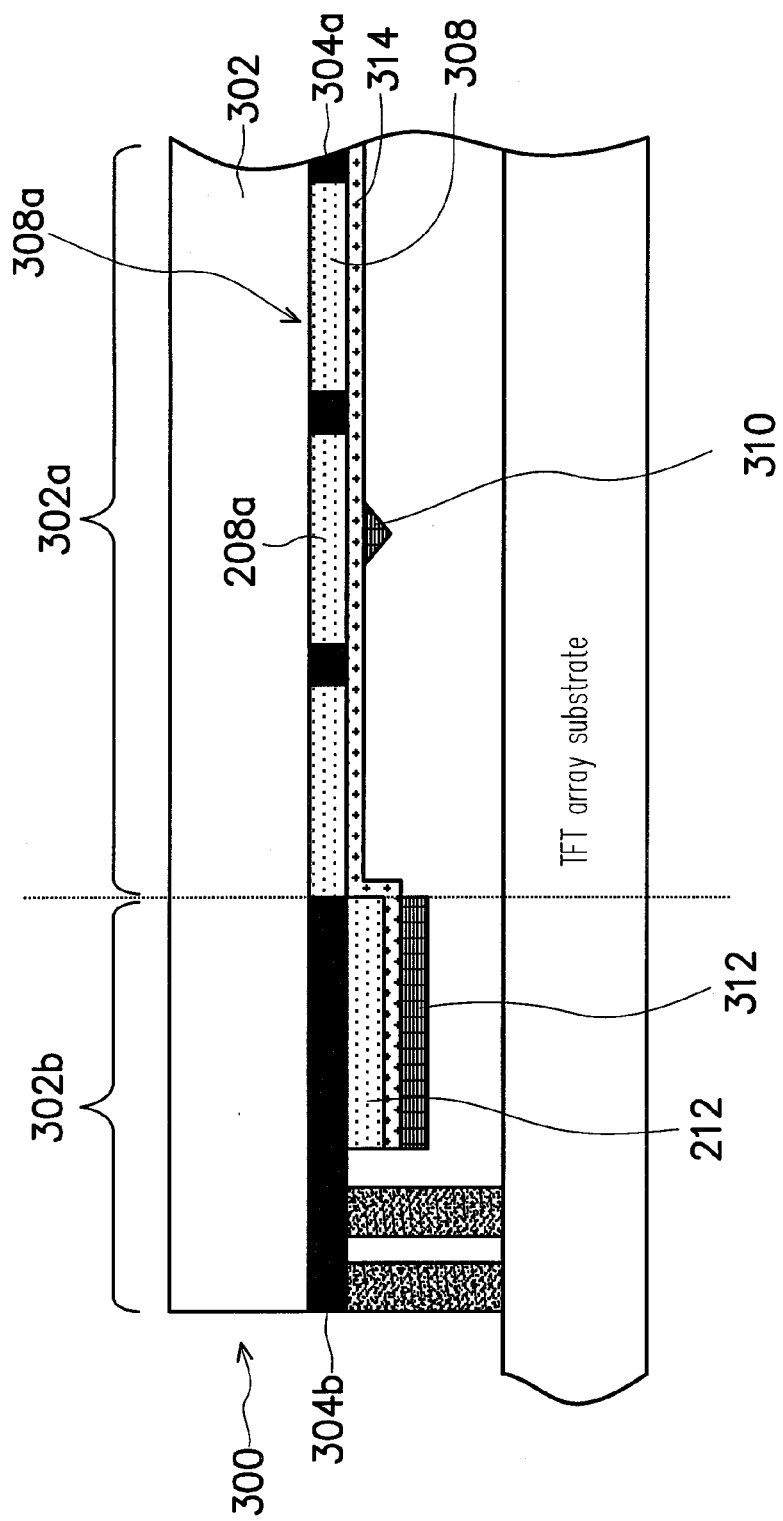

It is noted that, except for forming the light shielding layer described above with the alignment bump, a plurality of color photoresist layers can also be formed according to the previous embodiments, as shown in FIG. 7.

Accordingly, the color filter and the manufacturing method thereof of the present invention can improve the problem of light leakage from the edge of the display area when the black matrix is made of black resin. It is noted that in an exemplary embodiment of the present invention, the color filter composed of blue photoresist layer has a better light shielding effect than that of red photoresist layer, and whereas the color filter composed of green photoresist layer has a worse light shielding effect. Furthermore, when the color filter is provided for a multi-domain vertical alignment (MVA) liquid crystal display panel, the light shielding layer can be formed with the alignment bump. Moreover, if the light shielding layer is provided together with the color photoresist layer described above, a variety of materials may be provided for forming the light shielding layer. Furthermore, in the manufacture of the color filter of the present invention, only the design of the mask is modified, but the process or and the material used in the manufacture remain same. Therefore, the light leakage problem can be effectively reduced and also the process is simplified.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A color filter, comprising:
a substrate, having a display area and a non-display area;
a black matrix, disposed on the substrate, wherein the black matrix defines the display area into a plurality of sub- pixel areas, and the black matrix covers the non-display area, which forms an edge of the display area;

a plurality of color filter units, disposed in the sub-pixel areas;

a light shielding layer, disposed over the black matrix; and a plurality of alignment bumps, disposed over the color filter units and the black matrix of the non-display area adjacent to an edge of the display area, wherein the light shielding layer comprises the alignment bumps disposed over the black matrix on the non-display area adjacent to the edge of the display area.

2. The color filter of claim 1, wherein the light shielding layer comprises a red photoresist layer, a green photoresist layer and a blue photoresist layer.

3. The color filter of claim 1, wherein the alignment bumps of the color filter are provided for a multi-domain vertical alignment (MVA) liquid crystal display panel.

4. The color filter of claim 1, wherein the light shielding layer and the alignment bumps are comprised of similar material.

5. The color filter of claim 1, wherein the black matrix comprises a black resin.

6. The color filter of claim 1, wherein the color filter units comprise a plurality of red filter units, a plurality of green filter units and a plurality of blue filter units.

7. A process of forming a color filter, comprising:
providing a substrate having a display area and a non-display area;
forming a black matrix over the substrate, wherein the black matrix defines the display area into a plurality of first sub-pixel areas, a plurality of second sub-pixel areas and a plurality of third sub-pixel areas, and the black matrix covers the non-display area, which forms an edge of the display area;
simultaneously forming a first color filter unit in each of the first sub-pixel areas, and forming a first light shielding layer over the black matrix;
forming a second color filter unit in each of the second sub-pixel areas;
forming a third color filter unit in each of the third sub-pixel areas;
forming a plurality of alignment bumps over the black matrix, the first color filter unit, the second color filter unit, and the third color filter unit after the third color filter unit is formed; and
simultaneously forming a fourth light shielding layer over the black matrix on the non-display area adjacent to an edge of the display area during the formation of the alignment bumps.

8. The process of claim 7, further comprising:
forming a second light shielding layer over the first light shielding layer as the second color filter unit is formed.

9. The process of claim 8, further comprising:
forming a third light shielding layer over the second light shielding layer as the third color filter unit is formed.

10. A liquid crystal display panel comprising:
a thin film transistor array substrate;
a color filter, comprising:
a substrate, comprising a display area and a non-display area;
a black matrix, disposed on the substrate, wherein the black matrix defines the display area into a plurality of sub-pixel areas, and the black matrix covers the non-display area and forms an edge of the display area;
a plurality of color filter units, disposed in the sub-pixel areas;
a light shielding layer, disposed over the black matrix;
a plurality of alignment bumps, disposed over the color filter units and the black matrix on the non-display area adjacent to an edge of the display area, wherein the light shielding layer comprises the alignment bumps disposed over the black matrix on the non-display area adjacent to the edge of the display area;
a glue disposed between the thin film transistor array substrate and the black matrix to form a sealed space therebetween; and
a liquid crystal layer disposed in the space.

11. The liquid crystal display panel of claim 10, wherein the light shielding layer comprises a red photoresist layer, a green photoresist layer and a blue photoresist layer.

12. The liquid crystal display panel of claim 10, wherein the alignment bumps of the color filter are provided for a multi-domain vertical alignment (MVA) liquid crystal display panel.

13. The liquid crystal display panel of claim 10, wherein the light shielding layer and the alignment bumps are comprised of similar material.

14. The liquid crystal display panel of claim 10, wherein the black matrix comprises a black resin.

15. The liquid crystal display panel of claim 10, wherein the color filter units comprise a plurality of red filter units, a plurality of green filter units and a plurality of blue filter units.

16. A process of forming a liquid crystal display panel, comprising:
providing a substrate having a display area and a non-display area;
forming a black matrix over the substrate, wherein the black matrix defines the display area into a plurality of first sub-pixel areas, a plurality of second sub-pixel areas and a plurality of third sub-pixel areas, and the black matrix covers the non-display area, which forms an edge of the display area;
simultaneously forming a first color filter unit in each of the first sub-pixel areas, and forming a first light shielding layer over the black matrix;
forming a second color filter unit in each of the second sub-pixel areas;
forming a third color filter unit in each of the third sub-pixel areas;
forming a plurality of alignment bumps over the black matrix, the first color filter unit, the second color filter unit, and the third color filter unit after the third color filter unit is formed; and
simultaneously forming a fourth light shielding layer over the black matrix on the non-display area adjacent to an edge of the display area during the formation of the alignment bumps;
providing a thin film transistor array substrate;
disposing a glue between the thin film transistor array substrate and the black matrix to form a sealed space therebetween; and
injecting liquid crystal into the space to form a liquid crystal layer therein.

17. The process of claim 16, further comprising:
forming a second light shielding layer over the first light shielding layer as the second color filter unit is formed.

18. The process of claim 16, further comprising:
forming a third light shielding layer over the second light shielding layer as the third color filter unit is formed.

* * * * *